(12) United States Patent
Deroo et al.

(10) Patent No.: US 7,999,852 B2
(45) Date of Patent: Aug. 16, 2011

(54) TEST OR CALIBRATION OF DISPLAYED GREYSCALES

(75) Inventors: Danny Deroo, Gullegem (BE); Tom Kimpe, Ghent (BE)

(73) Assignee: Barco N.V., Kortrijk (BE)

( * ) Notice: Subject to any disclaimer, the term of this patent is extended or adjusted under 35 U.S.C. 154(b) by 1404 days.

(21) Appl. No.: 10/578,572

(22) PCT Filed: Nov. 28, 2005

(86) PCT No.: PCT/BE2005/000175
§ 371 (c)(1), (2), (4) Date: May 5, 2006

(87) PCT Pub. No.: WO2006/056030
PCT Pub. Date: Jun. 1, 2006

(65) Prior Publication Data
US 2007/0055143 A1    Mar. 8, 2007

(30) Foreign Application Priority Data
Nov. 26, 2004  (EP) .................................. 04447263

(51) Int. Cl.
*H04N 17/02* (2006.01)
*G01R 13/02* (2006.01)
*G06F 19/00* (2011.01)
(52) U.S. Cl. ............. 348/189; 348/191; 702/67; 702/73
(58) Field of Classification Search .................. 348/181, 348/184, 189, 191; 345/904; 378/62; 600/425; 702/67, 73; 382/128, 131, 132
See application file for complete search history.

(56) References Cited

U.S. PATENT DOCUMENTS

| | | | |
|---|---|---|---|
| 5,483,259 A * | 1/1996 | Sachs ........................... | 345/600 |
| 5,754,222 A | 5/1998 | Daly et al. | |
| 5,923,315 A | 7/1999 | Ueda et al. | |
| 6,078,309 A | 6/2000 | Chen et al. | |
| 6,133,950 A | 10/2000 | Cheung-Mon-Chan et al. | |

(Continued)

FOREIGN PATENT DOCUMENTS
EP    0 935 232    8/1999
(Continued)

OTHER PUBLICATIONS

"Assessment of Display Performance for Medical Imaging Systems", AAPM On-Line Report No. 03, American Association of Physicists in Medicine, Copyright 2005.

(Continued)

*Primary Examiner* — Victor Kostak
(74) *Attorney, Agent, or Firm* — Bacon & Thomas, PLLC

(57) ABSTRACT

Testing a display involves display of a series of test patterns, each at a different luminance or color, and with a predetermined minimum difference of luminance or color from their background, each pattern being unpredictable to a user, and determining if the user has correctly identified the patterns. This can enable a more objective test without needing external measuring equipment. Calibrating the display involves determining an output luminance level by detecting a minimal difference of drive signal to give a just noticeable output luminance difference at a given high luminance drive level, and determining an absolute luminance of the given high input luminance level from the minimal difference and from a predetermined human characteristic of visibility threshold of luminance changes. This can avoid the need for an external or internal sensor. This can be useful during conformance checks or during calibration of the display for example.

11 Claims, 7 Drawing Sheets

U.S. PATENT DOCUMENTS

| | | | |
|---|---|---|---|
| 6,167,352 A * | 12/2000 | Kanevsky et al. | 702/81 |
| 7,233,312 B2 * | 6/2007 | Stern et al. | 345/156 |
| 7,304,482 B1 * | 12/2007 | Kay et al. | 324/615 |
| 7,538,791 B2 * | 5/2009 | Sugiyama et al. | 348/189 |
| 2001/0048733 A1 | 12/2001 | Schulze-Ganzlin | |
| 2002/0047828 A1 * | 4/2002 | Stern et al. | 345/156 |
| 2002/0130975 A1 * | 9/2002 | Yang et al. | 348/674 |
| 2003/0151781 A1 | 8/2003 | Ono | |
| 2005/0141907 A1 * | 6/2005 | Izumikawa et al. | 399/49 |
| 2005/0225639 A1 * | 10/2005 | Somers | 348/181 |
| 2006/0033880 A1 * | 2/2006 | Korneluk | 351/242 |
| 2006/0059513 A1 * | 3/2006 | Tang et al. | 725/37 |
| 2006/0247877 A1 * | 11/2006 | Bala et al. | 702/107 |

FOREIGN PATENT DOCUMENTS

| | | |
|---|---|---|
| JP | 2004-208017 | 7/2004 |

OTHER PUBLICATIONS

"Digital Imaging and Communications in Medicine (DICOM) Supplement 28: Grayscale Standard Display function", National Electrical Manufacturers Association, Jan. 28, 1998.

"Digital Imaging and Communications in Medicine (DICOM) Part 14: Grayscale Standard Display Function", National Electrical Manufacturers Association, Copyright 2004.

* cited by examiner

| 81 | DETERMINE BLACK AND WHITE ABSOLUTE LUMINANCE LEVELS |
| --- | --- |
| 83 | USE DDL BLACK LEVEL AS START POINT FOR LUT |
| 84 | USE ABS WHITE DDL VALUE AS ENDPOINT FOR LUT |
| 86 | CALCULATE GREY DDL VALUES USING DISPLAY TRANSFER FUNCTION AND ABS WHITE DDL VALUE AS A MULTIPLIER |
| 88 | TEST NEW LUT FOR CONFORMANCE |

TEST OR CALIBRATION OF DISPLAYED GREYSCALES

FIELD OF THE INVENTION

This invention relates to systems for testing displays, to systems for determining luminance levels of displays, to systems for calibrating displays, and to corresponding methods.

DESCRIPTION OF THE RELATED ART

It is known that calibration of a display (in medical imaging also called a soft-copy viewing station) is an important component of effective medical imaging (including imaging of anatomy, imaging for diagnostic or clinical use, etc.). In many cases, there are very small luminance differences between an area of interest (which itself may be very small) and the surrounding area. Without proper display system calibration, it is possible that the viewing station itself can adversely affect the ability to make a proper diagnosis or interpretation of the image being displayed. Particularly if using an uncalibrated commercial colour monitor, the low-level shades of grey may be particularly hard to distinguish from one another.

For medical images there have been several guidelines that have been developed for calibration. When the American College of Radiology (ACR) and National Electrical Manufacturers Association (NEMA) formed a joint committee to develop a Standard for Digital Imaging and Communications in Medicine (DICOM), they reserved Part 14 for the Grayscale Standard Display Function (GSDF). This standard defines a way to take the existing Characteristic Curve of a display system (i.e. the relationship between the Luminance Output for each Digital Driving Level DDL or pixel value) and modify it to the Grayscale Standard Display Function. At the heart of the Grayscale Standard Display Function is the Barten Model. This model takes into account the perceptivity of the human eye. Given the black and white levels of the display system, it will spread out the luminance at each of the intermediary Digital Driving Levels such as to maximize the Just Noticeable Differences (JND) between each level. A JND is the luminance difference that a standard human observer can just perceive. Calibration has the aim that each DDL will be as distinguishable as possible from neighbouring levels, throughout the luminance range, and it will be consistent with other display systems that are similarly calibrated.

A part of DICOM, supplement 28, describes the GSDF (available at http://medical.nema.org/dicom/final/sup28_ft.pdf). It is a formula based on human perception of luminance and is also published as a table (going up to 4000 cd/m$^2$). It also uses linear perceptions and JND. Steps to reach this GSDF on a medical display are named 'Characterization', 'Calibration' and afterwards a 'Conformance check'. These will be discussed in more detail below.

Currently the above steps are done in most cases with quantitative methods by using a measurement device. In that case the accuracy of the GSDF Conformance Check result depends on all kinds of factors like deficiencies of the different devices used. This is not important in this context, running a calibration sequence on a stable, perfect performing display by using a perfect measurement device, will result in a nearly 100% match on the GSDF (there still is a quantisation error present and also some instability over time, temperature, . . . ). On the other hand, there are known solutions to reach the DICOM GSDF without using a measurement device, but by using a visual procedure.

It is also known that The American Association of Physicists in Medicine (AAPM) Task Group 18 have guidelines to practicing medical physicists and engineers for in-field performance evaluation of electronic display devices intended for medical use. They include a family of test images that can be used either visually, or in conjunction with test equipment to evaluate the performance of a display system. The user needs to tailor the tests based on whether a CRT based or LCD based display system is used. (A draft of the existing document can be found at http://deckard.mc.duke.edu/~samei/tg18).

Both CRT-based and LCD-based display monitors have been successfully used in medical imaging applications. From a calibration standpoint, a LCD-based display is typically more stable than a CRT-based display. A CRT can have variations from the electron gun, phosphor, and power supply that will disturb brightness settings and calibration. The LCD's primary source of variation is the backlight, although temperature, ambient lighting changes, and shock/vibration will also have effects. The characteristic curve of an uncalibrated LCD is poor in the sense of DICOM conformance, especially in the low-level grey shade regions. It is known to implement an initial DICOM correction (typically done via a Look-up Table or LUT), before utilizing the display for diagnosis, then make periodic measurements to ensure that the calibration correction is still accurate. Liability concerns mean that institutions need to show that they have properly implemented calibration into their medical imaging process. This involves the documentation of objective evidence that the viewing stations have been properly calibrated.

Known calibration tools include visual test patterns and a handheld luminance meter (sometimes referred to as a "puck") or a built-in sensor, to measure the conformance to the DICOM standard. These can provide the data to generate a custom LUT correction for DICOM Grayscale Display Function compliance. It is known to provide calibration software, such as the Image Systems CFS (Calibration Feedback System) to schedule when a conformance check occurs, and generate a new DICOM correction LUT if needed. A log of tests and activity can provide a verifiable record of compliance testing, and reduce the need for technicians to take manual measurements.

It is known from U.S. Pat. No. 5,298,993 to provide an instrumentless display calibration system which generates adjustment images with a symbol that appears light on dark when misadjusted in one direction; dark on light when misadjusted the other way; and disappears at the point when the display is adjusted correctly. This can be used to calibrate brightness, colour, gamma and sharpness. A plot of brightness versus numeric pixel value for a display can be used in various ways. For example, a palette lookup can precisely correct for display nonlinearities. In one scenario, a monitor is tested, and a correction palette generated for the monitor. Since a lot of customers do not have calibration equipment or the expertise to re-calibrate a display, monitor aging, repair or replacement parts could adversely affect the original calibration. Using the calibration system, the brightness curve could be regenerated quickly with the user observing and answering a computer prompt, "is the symbol lighter, darker or equal to the background?". The system can span the entire brightness curve. First, assign light to 100% white and dark to 0% white. With monitor adjustments fixed, a user can adjust a middle tone until the symbol disappears. This gives the numeric pixel value that results in a lumens output 50% (middle tone) of the halfway between white and dark. Next, the numeric value that provides 75% lumens can be calculated in one of two ways.

First, dark can be assigned to the value just found to give 50% lumens as above, and leave light assigned to 100% white. Alternatively, a halftone pattern may be used that has 75% white pixels and 25% black pixels. In either case, the null for middle occurs at 75% lumens. The curve can be further articulated employing the same technique to whatever granularity required.

As discussed in US published application 20030151781, a known calibration proceeds as follows. Firstly, a chart for a correction is displayed on the imaging apparatus, for example, a grey chart on which driving levels of the imaging apparatus are shown to be different in each step. Then the display of the chart is read by a densitometer or luminance meter, and a density or luminance on each step is detected. Since the detected density or luminance data (gradation measurement data) correspond to the gradations of each step only, a value between each gradation is interpolated based on the detected density or luminance data, to make characteristic data of the imaging apparatus, using for example, Spline interpolation or Akima interpolation.

After the characteristic data of the imaging apparatus are obtained, a look-up table which shows a relation between the driving levels and the gradation levels of the image data is made and the outputted gradation levels are corrected in accordance with the look-up table (for example proportional to the driving level to the 2.2 power that is an ordinary characteristic of a CRT, as set out in GSDF characteristics of DICOM PART 14).

In case the luminance data after the interpolation have an increasing tendency with the increase of the driving level, but the luminance data after the interpolation do not show a monotonous increase, a correction step is used. This involves forming the second characteristic data of the monitor again, by correcting the detected luminance data in a way that the increase of the luminance data after an interpolation becomes a monotonous increase.

There remains a need for improved testing and calibration methods.

SUMMARY OF THE INVENTION

An object of the invention is to provide improved apparatus or methods for testing and calibration of displays, in particular for example medical displays.

According to a first aspect, the invention provides a system or arrangement for testing a display, the arrangement having a test generator arranged or adapted to display a series of test patterns, each at a different luminance or colour, and with a predetermined minimum difference of luminance or colour from their background, each pattern being unpredictable to a user, and having a test evaluator arranged to determine and record if the user has correctly identified each of the patterns. The test generator is arranged to display alongside each displayed test pattern a selection of candidate patterns for the user to choose a matching pattern.

This can enable a more objective test of visibility of luminance or colour differences at different luminance levels or colours without needing external measuring equipment. The minimum luminance difference can be set to various levels according to how stringent the test needs to be. It can be carried out simply by an unskilled user, and can reduce the risk of the user giving "false positive" responses, particularly if a user is in a hurry or is fed up with the testing procedure.

The arrangement has a means for the user to input information relating to the identification of each pattern.

Another feature is the test generator being arranged to display an array of more than one of the test patterns at a time. For example the array of test patterns reveals a question arranged such that its answer indicates if the patterns have been read correctly. This can enable one user input to be used for testing multiple patterns, to speed up testing.

The system may have means for setting minimum difference. This can be varied to suit different uses. If a test is failed, i.e. some of the test patterns cannot be correctly distinguished from the background, the difference of luminance or colour between the test patterns and the background can be altered to increase that difference until the test is passed, i.e. test patterns can be distinguished from the background, and the user can make use of the display for less demanding tasks.

The system may have means for sending a result of the testing, and an identifier of the display being tested, to a remote database. The system may also, or alternatively, have means for retrieving calibration data from the remote database for a display of a same type as a display for which the result of the testing has been stored previously.

The system may have means for selecting different levels of background luminance or colour to test, the selection being spread across the range of the display.

The system may be arranged to choose a different selection for subsequent tests, to test all levels after a given number of tests.

The system may have a calibrator for altering circuitry used to derive the driving levels of the display.

Another aspect of the invention provides a system or arrangement for determining an output luminance level displayed by a display for a given luminance drive signal, having a detector for detecting a minimal difference of drive signal to give a just noticeable output luminance difference at a given high luminance drive level, and a processing arrangement arranged to determine an absolute luminance of the given high input luminance level from the minimal difference and from a predetermined human characteristic of visibility threshold of luminance changes at different luminance levels.

This can enable the absolute light output levels to be determined without the need for an external or internal sensor, or to check the results of a sensing operation for example. This can be useful during conformance checks, or during calibration of the display for example.

An additional feature of this aspect of the present invention is the processing arrangement being further arranged to determine a change in output luminance corresponding to the minimal difference of drive signal, and use the change in output to determine the absolute level, using the human characteristic.

Another such additional feature is the processing arrangement being arranged to use a known transfer function of the display to determine the change in output from the detected minimal difference.

Another such additional feature is the system furthermore comprising means for spatially or temporally dithering the drive signal to the display to make the smallest difference smaller between drive signals of which the corresponding output luminance can be displayed on the display.

Another such additional feature is the given high input luminance level being white.

Another such additional feature is the detector being arranged to display an unpredictable pattern, and receive an indication of whether a user can identify the pattern correctly, then repeat this test with reduced difference, until the user cannot correctly identify the pattern.

Another such additional feature is the detector being arranged to dim the display to use a point on the human characteristic with more variation gradient. This can improve accuracy, if the display can be dimmed in a predictable, preferably linear, fashion.

Another such additional feature is the system being arranged to determine a black output level by detecting a just noticeable difference of luminance at a black luminance input level, and deriving the absolute luminance of the black luminance input level from the just noticeable difference and from the predetermined human characteristic of visibility threshold of luminance changes at different luminance levels.

Another such additional feature is the system being arranged to calibrate the display using the determined absolute white and black luminances to adjust a converter of the display used to convert input p values into drive levels. This can ensure small differences at the black and white extremes are still visible.

Other aspects of the invention include methods of carrying out testing or calibrating of displays. The method may include the step of marking the display with indicia that the display is suitable for displaying medical images.

The present invention provides a method of testing a display having the steps of displaying a series of test patterns, each at a different luminance or colour, and with a predetermined minimum difference of luminance or colour from their background, each pattern being unpredictable to a user, and determining and recording if the user has correctly identified each of the patterns, wherein displaying the series of test patterns includes displaying alongside each displayed test pattern a selection of candidate patterns for the user to choose a matching pattern.

The present invention also provides a method of calibrating a display having the steps of determining an output luminance level displayed by a display for a given luminance drive signal, by detecting a minimal difference of drive signal to give a just noticeable output luminance difference at a given high luminance drive level, and determining an absolute luminance of the given high input luminance level from the minimal difference and from a predetermined human characteristic of visibility threshold of luminance changes at different luminance levels, and using the determined absolute output luminance to determine a correction for the display.

In the above method, detecting a minimal difference of drive signal to give a just noticeable output luminance may comprise spatial dithering or temporal dithering of the luminance drive signal.

The method for calibrating may furthermore comprise visually detecting whether the display system is perceptually linear or not. Visually detecting whether the display system is perceptually linear or not may include driving a first pattern with a first combination of luminance drive signals and a second pattern with a second combination of luminance drive signals, the first combination of luminance drive signals and the second combination of luminance drive signals being different but having a same average drive level, and determining a difference in output luminance of the first and second patterns. The first pattern may be a background and the second pattern a symbol represented on the background. The first drive level may be a plain drive level and the second drive level may be a temporally or spatially dithered drive level or vice versa. Alternatively, both the first and the second drive levels may be temporally or spatially dithered drive levels, the first and the second drive levels being different from each other.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present claims.

BRIEF DESCRIPTION OF THE DRAWINGS

How the present invention may be put into effect will now be described by way of example with reference to the appended drawings, in which.

DESCRIPTION OF THE PREFERRED EMBODIMENTS

Figure 1:
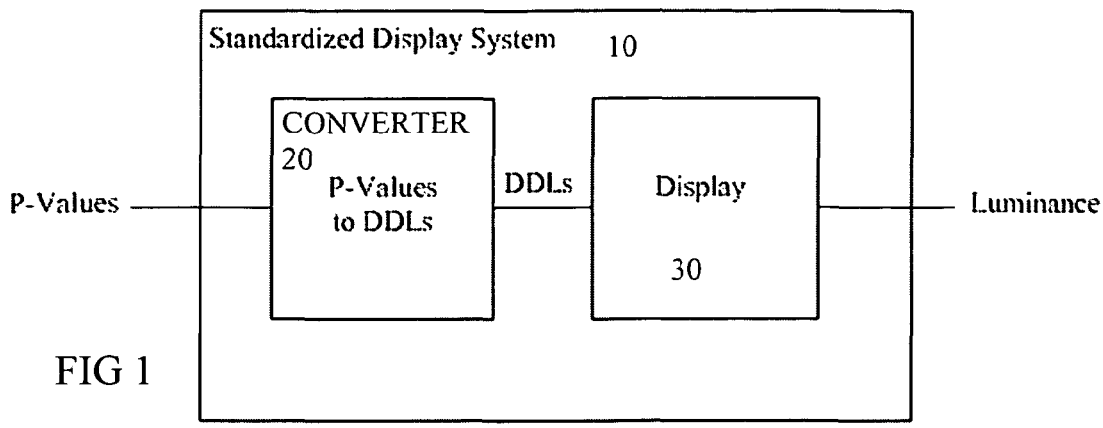
FIG. 1 shows a known display arrangement.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

This invention relates to systems for testing displays, to systems for determining luminance levels of displays, to systems for calibrating displays, and to corresponding methods. Any type of display may be used, especially those displays which are used for medical imaging. Such displays can be CRT based or fixed format or flat panel displays of which LCD, plasma, LCOS, EL displays are only some examples. The displays may be non-pixelated such as a CRT display or pixelated like the fixed format displays. The displays may also be made up of several sub-displays or "tiles" and the complete display of an image is made up of a combination of sub-images on the tiles.

By way of introduction to the embodiments, some terms will be discussed. Luminance refers to the amount of light emitted, transmitted, or reflected from a surface. The preferred SI unit of luminance is candela per square meter. Other units that are still commonly encountered include the foot-lambert (1 fL=3.426 $cd/m^2$) and the nit (1 nit=1 $cd/m^2$). Luminance is the measurable quantity that corresponds to the subjective term "brightness," which is the human perceptual response to the appearance of a surface with some luminance. Assuming that other factors (e.g., CRT noise, artefacts) remain constant, brightness may be discussed in terms of the just-noticeable-difference (JND) index, where 1 JND is the luminance difference between a target and a uniform background required for the target to be just perceptible. Displays with larger ranges between the minimum and maximum luminance values tend to provide more JNDs (again, assuming that other display characteristics remain unchanged) and therefore improved ability to display targets with small contrast.

The above-mentioned steps to reach GSDF on a medical display, named 'Characterization', 'Calibration' and 'Conformance check' will now be discussed, in relation to FIGS. 1 to 4. FIG. 1 shows a display system 10 for producing a standardised output, having a converter 20 for converting input p-values (pixel or perceived values) into DDL (digital drive levels) so as to apply a correction to correct for nonlinearities in the subsequent display 30. These DDLs are fed to the display 30 to produce a luminance output. A display system comprises at least a display and a graphic board. Calibration controls the display system, i.e. the display and the graphic board.

Characterization

Figures 2, 3:
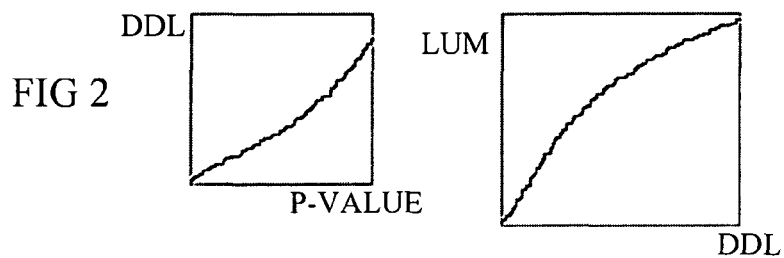
FIGS. 2 to 4 show graphs of characteristics of the display of FIG. 1.

In this process the characteristic curve or transfer function of the display 30 is determined. This is the natural behaviour of the display 30 (without applying any correction). This is normally done by using a luminance measurement device. For all applied DDLs (Digital Driving Levels) the output luminance values are captured, this results in a transfer function describing the characteristic curve of the display 30. An example is shown in FIG. 3.

Calibration

Figure 4:
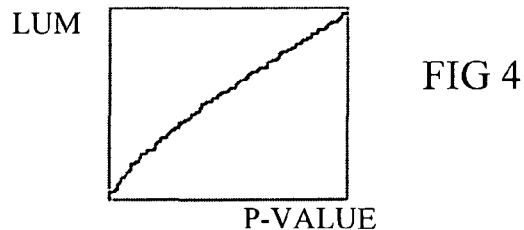

Once the characteristic curve of the display 30 is known, the values for the white, black and ambient luminance should also be known. Now the actual part of the DICOM GSDF curve can be determined which is the target curve. Since the current function (characteristic curve) of the display 30 and target function are known, a correction function can be calculated. An example is shown in FIG. 2. This is done in a calibration process and the result may for example be stored into a LUT (Look Up Table). An application which generates a picture to be displayed, draws p-values (pixel values), which are translated by the correction function to DDLs and through this correction the medical images shown on the display 30 are DICOM GSDF compliant. FIG. 4 shows an example of the combined effect of the correction function and the transfer function of the display 30.

DICOM GSDF Conformance Check

For quality assurance, the behaviour of this calibrated display system 10 needs to be checked. This is normally done by using (the same or another) measurement device measuring all luminance levels for every p-value. The measured curve should follow the DICOM GSDF curve (set as target during calibration). In practice this match is never 100% and so there are different methods to calculate and quantify differences between the measured and theoretical target curve.

Existing Visual Solutions for Characterization & Calibration

In a prior art solution, the characterization can be done by combining a foreground and a background image in combination with a slider to modify an intensity of foreground or background. One of the foreground or background image is displayed as a checkerboard or line pattern. The goal is to adjust the slider so that the intensities of both the foreground and the background image become similar to the human eye.

Once this is done for several steps, the characterization for the display is known. An assumption on the white, black and ambient light is made and the calibration happens by calculating the right correction LUTs.

This procedure is very subjective and is dependent of a lot of external factors. The biggest problem is that even keeping all environmental and external factors the same, running this characterization with 10 different people can give 10 different results.

Known DICOM GSDF Conformance Check

This check is at present done by using test patterns. When test patterns are used, the technical details are normally described in a guide document accompanying the software application. These details contain what parts of the test patterns the user should look at for detecting display deficiencies (e.g. the lines for geometry adjustments can be observed). In a more advanced application the test patterns are shown and the user is guided to look for specific details. In that case a question is shown on top of the test pattern, the user answers by selecting Yes/No (or he can cancel the check). This is a more guided way to do a check.

There are essentially two groups of known test patterns:

a) Test patterns with all kinds of combined checks

For example SMPTE (Society of Motion Picture and Television Engineers) and AAPM (American Academy of Pain Medicine) TG18 QC test patterns are in this category. The DICOM GSDF compliance check is in the best case done by running following tests:

On SMPTE: The portion of DICOM GSDF compliance in this pattern is only about being able to see a 5% box on a black background and a 95% box on a white background. A problem with this solution is that 5% and 95% checks are not representative for a DICOM GSDF Conformance check.

For the TQ18-QC pattern the words "QUALITY CONTROL" are displayed for 3 different levels of grey (dark, medium and light). Every letter of these words is showed with a different p-value relative to the background: The 'Q' has a difference of 14 p-values and the L has only a difference of 1 p-value to the background. The description mentions to look for all letters of the 3 occurrences of "QUALITY CONTROL". A problem with this solution is that the number of checks are not representative for a DICOM GSDF Conformance check: over the total range of 256 p-values (assuming an 8 bit system) 3 values are checked with a variance of 1 p-value, 3 with a variance of 2 p-values, etc. This is not sufficient. A second problem is that it is very hard to see the 'L' in a lot of cases, as other test pattern content (like bright white) disturbs the adjustment of the eye and can make the 'L' invisible.

b) Specific test patterns for DICOM GSDF Conformance (e.g. Briggs and Bands with text). All current solutions focus on seeing all or some details in one or more test patterns, but there is no clean solution for obtaining an objective and clear result from a visual check. All guided checks post some questions on top of test patterns, but in these cases the answers can always lead to non-conformance of the tested displays.

Conventional methods for visual characterization/calibration are subjective as there is no knowledge about the white and black luminance values. These are needed for DICOM GSDF calibration. For ambient light a predefined value (like low, medium, high) can be accepted. Visual characterization is very subjective: with 10 persons you can get 10 different results.

Figure 5:
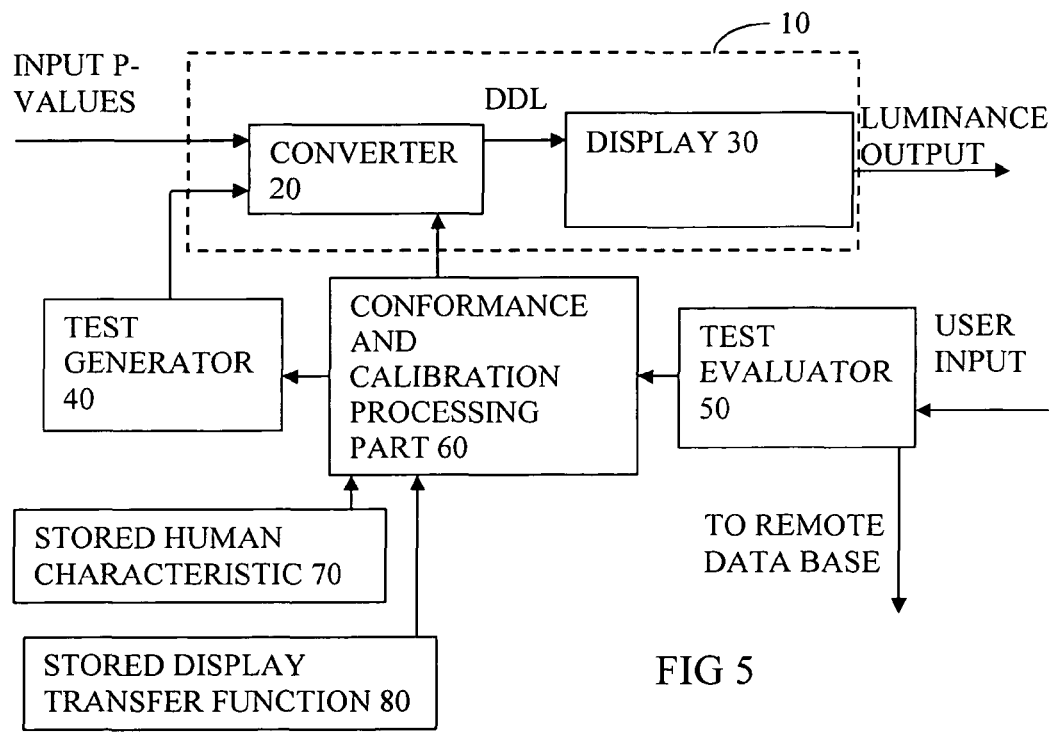
FIG. 5 shows a system according to a first embodiment of the present invention.

A first embodiment of the invention, illustrated in FIG. 5 shows a display system 10 comprising a converter 20 and a display 30 as before. In this case, there is also a test generator 40 arranged to feed test patterns and backgrounds to the display 30 via the converter 20. A test evaluator 50 receives user input concerning whether the test patterns are visible, and checks if the patterns have been identified correctly. The test generator 40 and test evaluator 50 can form an example of a detector for determining a change in output luminance corresponding to a minimal difference of drive signal. The test results can be output to a remote database, or can be used for calibration. The system can also include parts for calibration. A conformance and calibration processing part 60 can be used to adjust the converter 20, typically by altering a look up table. Alternatively, the conformance and calibration processing part 60 can be used to for example adjust parameters in some form of a mathematical correction function. As will be discussed below, this processing part 60 can use inputs from the test evaluator 50, a stored human characteristic 70, and a stored display transfer function 80. The processing can be implemented by conventional hardware such as a general-purpose microprocessor or ASIC, an FPGA, PLC, PCL, PAL, or a desktop computer for example, running software written in a conventional programming language.

Figure 6:
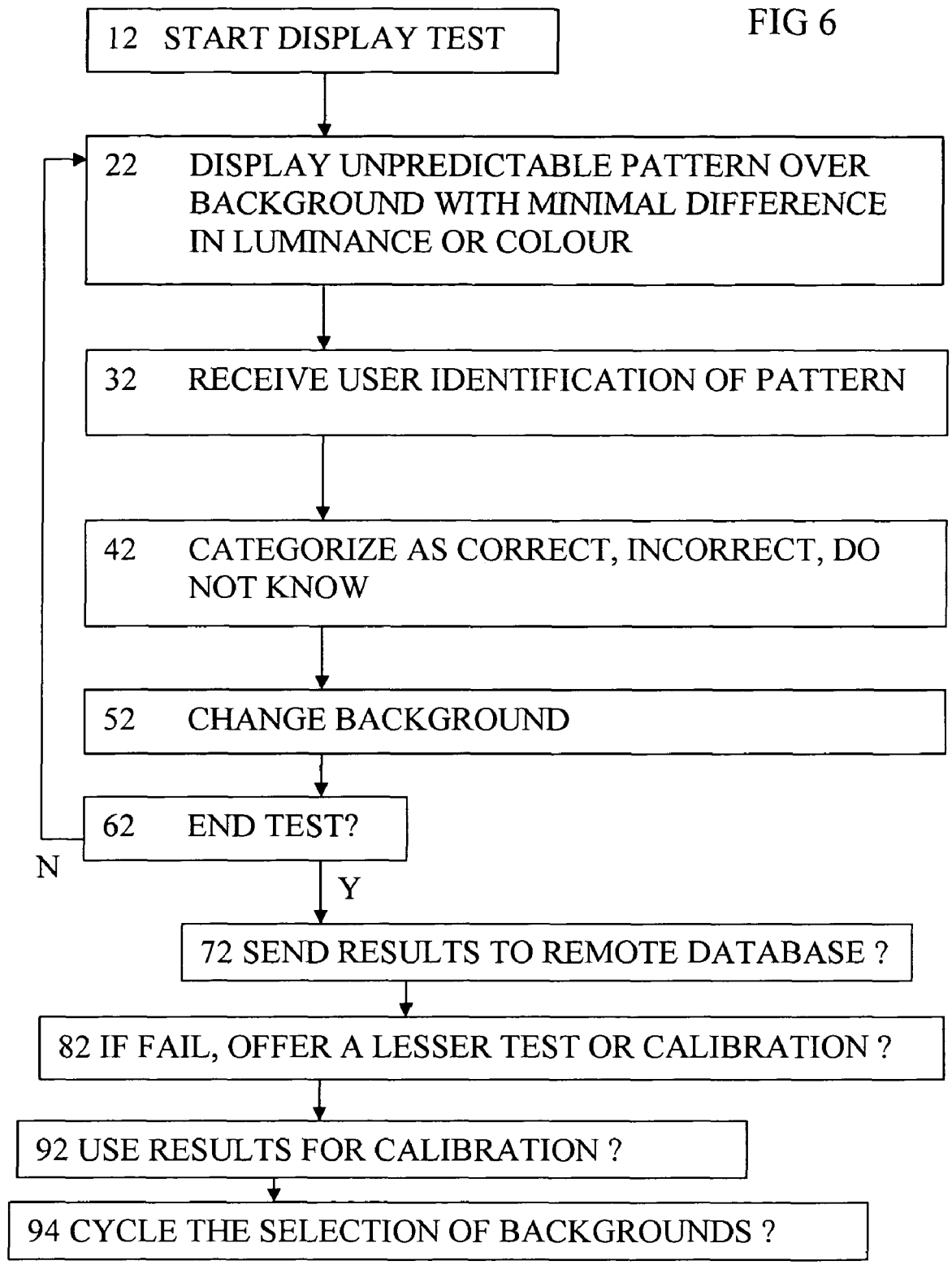
FIG. 6 shows steps according to another embodiment of the present invention.

FIG. 6 shows some of the principal steps in a display test according to an embodiment of the present invention. The test is started at step 12. At step 22, the unpredictable test pattern is displayed over a background with minimal difference in colour or luminance between the test pattern and the background. At step 32, the system receives the user identification of the pattern, i.e. an indication of whether the user is able to distinguish the test pattern from the background. This is categorized as correct, incorrect or do not know, at step 42. The background may be changed at step 52 and if the test is to continue, at step 62 a decision is made whether or not to repeat the test, the method is repeated as from step 22 onwards.

After finishing the test, the test results may be sent at step 72 to a remote database, to enable a verifiable test record to be maintained. At step 82, if the test is failed, the system may offer a user a less stringent test, using a greater minimal difference, or may offer a calibration process. At step 92 is an illustration of using the test results for the calibration. An example of this will be described below. At step 94, the selection of the backgrounds is cycled so that even if only some background levels or colours are tested in one test, after a number of tests, all the levels or colours will eventually have been tested.

Figure 12:
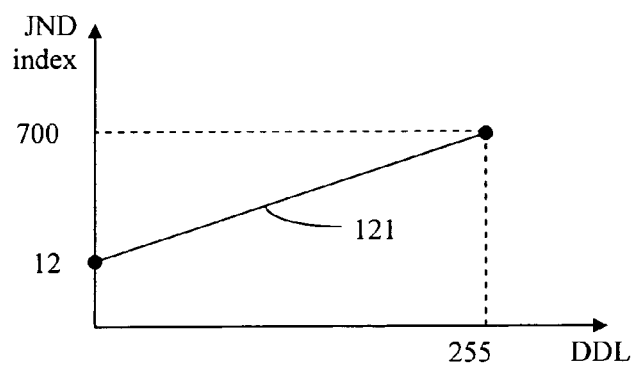
FIG. 12 is a graph of JND index versus drive level DDL in case of a perfectly calibrated display.

In case of perfect calibration, the display is perfectly "perceptually linear", as also illustrated by curve 121 in FIG. 12. This means that for every two different drive levels DDL, the higher one of the two results in a higher JND index than the lower one. With perfect calibration, the output of a specific drive level DDL will be perceived exactly the same as the output resulting from a combination of drive levels that have the same average value. As an example, if 4 by 4 pixels are each driven by a drive level 105 as shown hereinbelow,

| 105 | 105 | 105 | 105 |
| 105 | 105 | 105 | 105 |
| 105 | 105 | 105 | 105 |
| 105 | 105 | 105 | 105 | then the output of these pixels will be perceived as being exactly the same greyscale as a 4 by 4 matrix of pixels each driven so that their average drive levels are 105, for example driven as follows:

| 100 | 110 | 100 | 110 |
| 110 | 100 | 110 | 100 |
| 100 | 110 | 100 | 110 |
| 110 | 100 | 110 | 100 |

Figure 13:
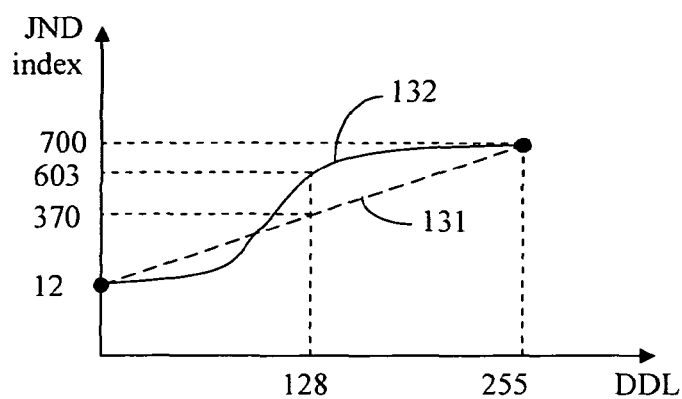
FIG. 13 is a graph of JND index versus drive level DDL in case of a not perfectly calibrated display.

If, however, calibration is not perfect then the curve illustrating JND index in function of drive level DDL could for example look as curve 132 illustrated in FIG. 13, curve 131 representing JND index in function of DDL in case of perfect calibration.

In this situation, a plain greyscale with respect to a specific drive level value a will not look the same as a dither pattern of several levels having the same average DDL value a.

For example, if a dither pattern looks like

| 0 | 255 | 0 | 255 |
| 255 | 0 | 255 | 0 |
| 0 | 255 | 0 | 255 |
| 255 | 0 | 255 | 0 | and the second pattern looks like

| 128 | 128 | 128 | 128 |
| 128 | 128 | 128 | 128 |
| 128 | 128 | 128 | 128 |
| 128 | 128 | 128 | 128 | then both pattern 1 and pattern 2 have a same average DDL level equal to 128. However, driving levels corresponding to these patterns do not result in a same output to be perceived. Pattern 1 will be perceived as having JND index 370, while pattern 2 will be perceived as having JND index 603.

The method according to embodiments of the present invention therefore allows to visually detect whether a display system is perceptually linear or not. This is different from prior art techniques, where methods allow to determine whether grey scales can be perceived or not.

Figure 14:
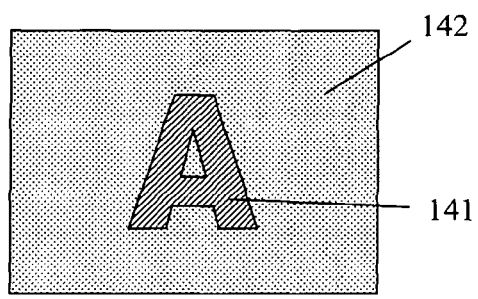
FIG. 14 shows a symbol A illustrated on a background.
Figures 15A, 15B, 15C:
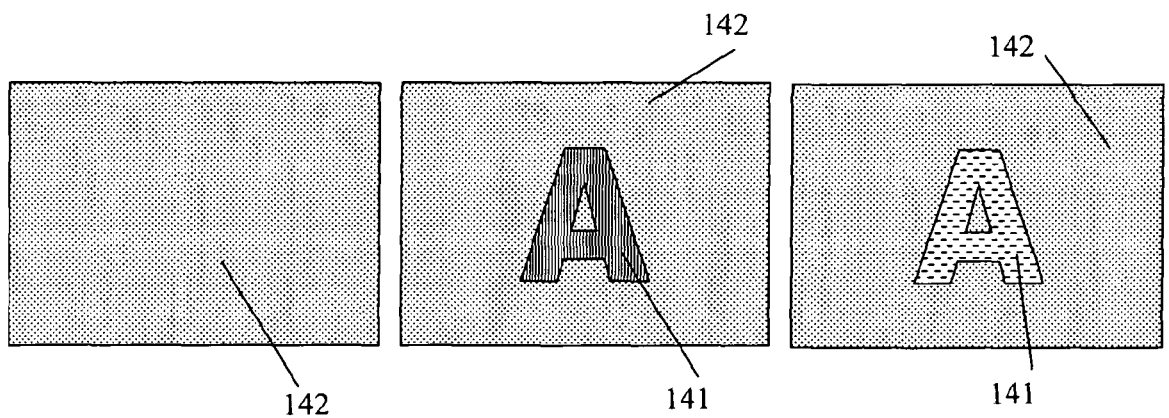
FIG. 15($a$), FIG. 15($b$) and FIG. 15($c$) show options for a user to indicated what he or she perceives when the symbol and the background of FIG. 14 are each driven by a drive level with the same average drive level value, one of the symbol and the background being driven by a plain drive level and the other one being driven by a dither pattern.

According to embodiments of the present invention, the above may be implemented by representing symbols on a background, whereby the symbols and the background are driven one with a plain driving level and the other with dithered driving levels. As an example a first symbol 141, in the example illustrated in FIG. 14 e.g. A, is represented on a background 142. The background is driven with a plain video level a. The symbol is driven as a spatial dither pattern having the same average DDL value a as the plain video level. A user is asked to indicate what he perceives. He can choose any of the possibilities as illustrated in FIG. 15. In case the user selects the option of FIG. 15(a), it is clear that the display is perfectly calibrated: the user cannot distinguish a plain driving level from a dithered driving pattern having the same average driving level value. The option of FIG. 15(b) shows the symbol 141 darker than the background 142 and the option of FIG. 15(c) shows the symbol 141 paler than the background 142.

Based on the answer of the user it can be decided whether calibration is OK (option (a)), whether the curve is too high compared to the target calibration curve (option (b)) or whether the curve is too low compared to the target calibration curve (option (c)).

It is to be noted that the above test can be performed a several "average DDL levels". Furthermore, the test can be performed iteratively, whereby in each iteration the calibration can be improved.

Figure 7:
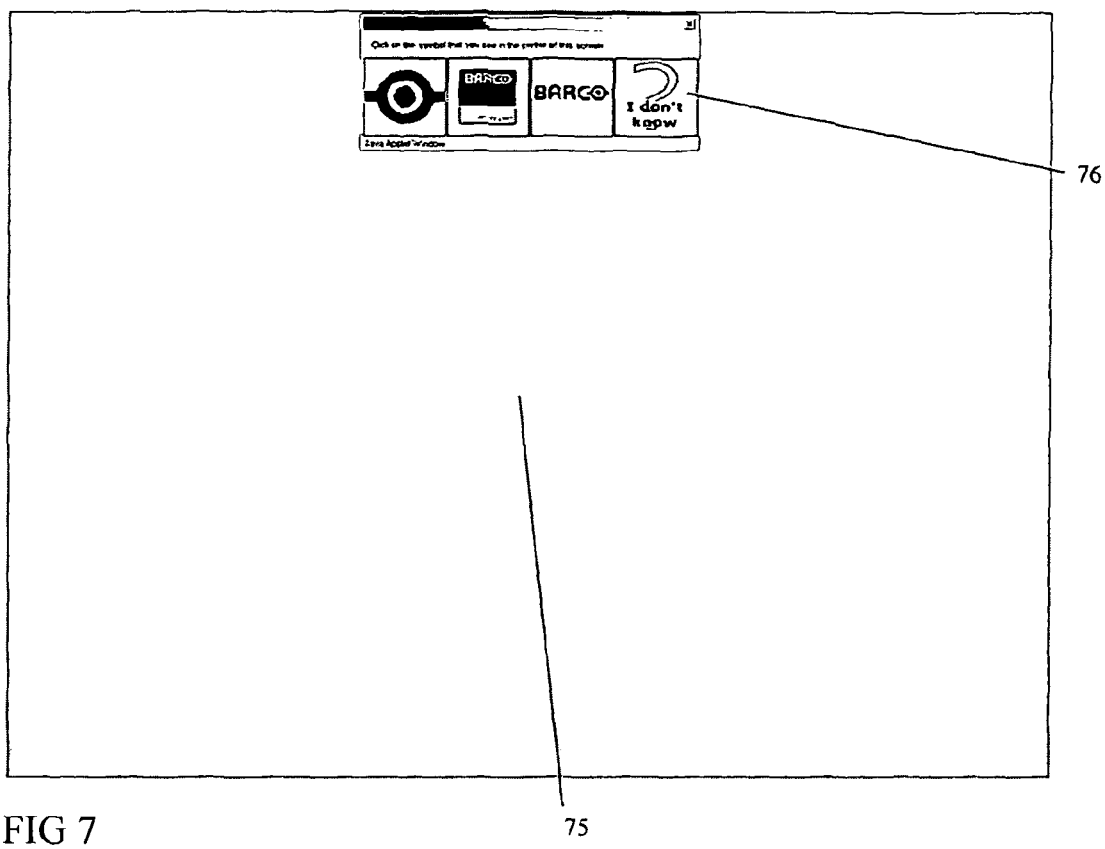
FIG. 7 shows an example of a test pattern on a background, and candidate patterns.

According to embodiments of the invention, a sequence of patterns is thus shown in an interactive, objective way: the pattern or sequence is shown, and at every user question the user has to make a positive choice of what is determined in the pattern. The patterns are unpredictable, and therefore so is the answer. The patterns are unambiguous so there is only one good answer possible on every question in the sequence. A sample of one step in the sequence is shown in FIG. 7. The test pattern 75 is shown barely visible in the middle of the grey background. At the top of the screen, a number of candidate patterns 76 is shown, and the user is asked to choose a matching pattern or select a "don't know" option. The user input can be by way of a touch screen, a pointing device such as e.g. a mouse, or by entering a number or sequence of numbers or other character or sequence of characters into a keyboard or in any other way.

The DICOM GSDF Conformance check is done by running through a number of steps. In every step a test pattern under the form of a symbol (or image) is shown on top of a background. The symbol differs from the background with a number of p-values, the number being zero, in which case "don't know" would be the right answer to the question (see below), one or more). On top of the image, a popup message is shown where the user has to answer the question "which of the patterns is shown?". The answer to the question is unique and not ambiguous. The display shows several candidate patterns under the form of symbols (or images) where the user has to pick the one he can detect in the shown image. If it is not visible, the user should select an option mentioning he cannot determine or see the symbol.

The number of steps is modifiable. Also the difference of the shown symbol comparing to the background (in p-values) can be varied. Another variation is that the user has to enter what he sees on the screen. The symbol can be a letter or digit (or a sequence of letters and/or digits) and the user is asked to type in the letter or digit (or the sequence of letters and/or digits) he can see. This again contains multiple steps. A second variation is that multiple (or all) steps can be combined in 1 step. An easy arithmetic can be shown on the image, e.g. "5+2=". Every symbol or digit is shown on a background with preferably a different p-value level, and with a corresponding p-value as foreground, e.g. the "5" is shown with a first foreground level on a first background level, and the "2" is shown with a second foreground level on a second background level, the first and the second background levels respectively and/or the first and second foreground levels respectively possibly being different from each other. The user is asked to enter the result. The whole screen can be filled with such content, so a lot of steps can be combined into one.

Solutions for Characterization/Calibration

A central service through the internet enables the user to run this visual calibration. It is based on the knowledge and test results of multiple users using the same or similar type of displays. The concept works with a knowledgebase of display characterization, calibration and conformance check information. For every type of displays the central storage contains white and black luminance values and possibly any other information that could be relevant for display calibration (such as but not limited to native transfer curve of the display, colour profile of the display, reflection coefficient of the display glass, . . . ). This information is used to do a much more accurate DICOM GSDF calibration.

Currently more and more home users (radiologists, doctors, referring physicians, . . . ) have remote access to PACS images of the medical facility they work to for. They now use their default, low-end displays for these purposes. They are not allowed to do any diagnostics on medical images on these displays (officially, but in reality this happens already today). They are allowed to use the displays for reviewing only.

In both cases, the images are not shown correctly. Since it is not a real medical display with dedicated features, there is still a need to let the user adjust his low-entry display in a way it can show medical images much better: an easy method to do a visual DICOM GSDF calibration and do a simple visual DICOM GSDF Conformance check on a regular time base.

Figure 11:
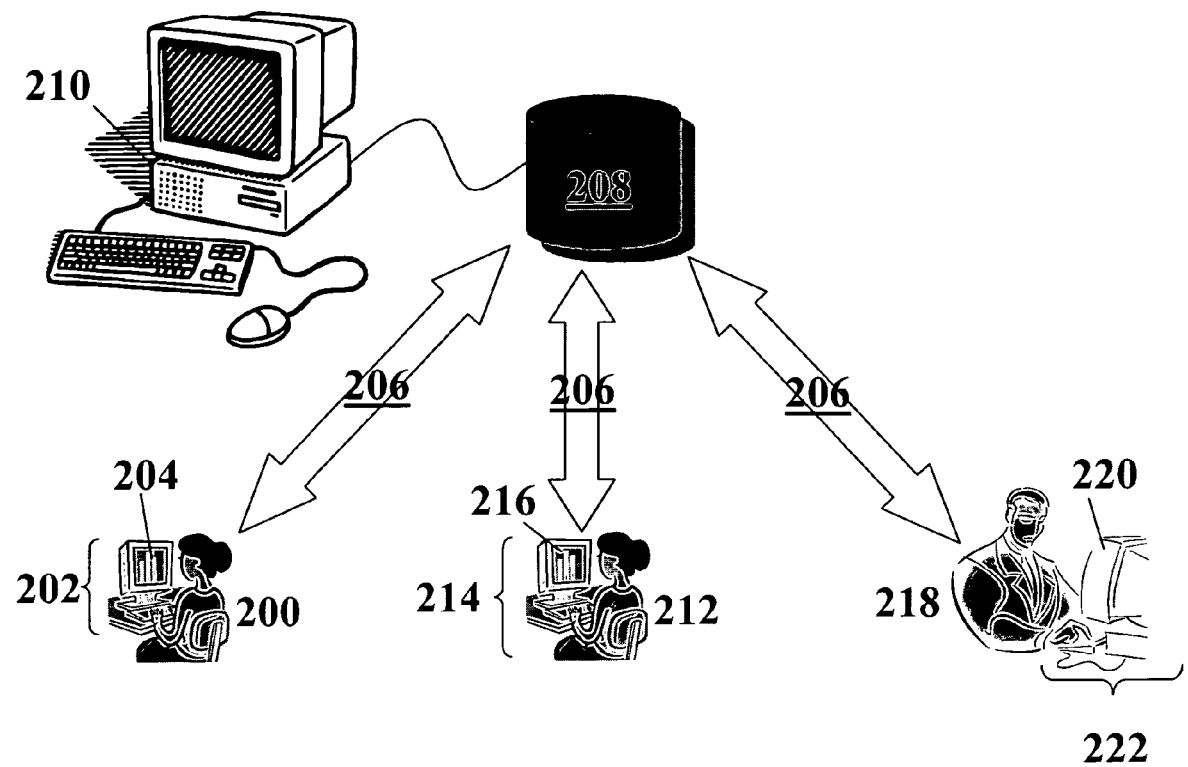
FIG. 11 illustrates different users being connected to a remote database for testing or calibrating of displayed greyscales according to embodiments of the present invention.

An example will clarify the above. Reference is made to FIG. 11.

A first user 200 runs a software application locally on his or her display machine 202, e.g. computer, which detects characteristics of the display 204 used on his or her display machine 202. This display machine 202 is connected via a network 206, e.g. a LAN or a WAN to a remote database 208. The display brand, type and specific settings are sent over the network 206 to the remote database 208.

When triggered by a network request from the display machine 202, e.g. computer, of the first user 200, a central application on a computer 210 connected to the remote database 208 runs a look-up application for presence in the remote database 208 of valid characterization data of the display 204.

1) If that information is found in the remote database 208, the validity (e.g. by the number of tests that already ran on this type of display) determines the assurance level of the calibration. A high assurance will result in a less extended test for the first user 200 to run (e.g. the number of greyscale levels to test). So the characterization data and the specifications of the initial test will be sent back from the remote database 206 to the machine 202 of the first user 200.

2) If the information is not found, i.e. the characterisation data of the display 204 is not present in the remote database 208, it is stored there and a generic characterization and extended test is sent back, over the network 206, from the remote database 208 to the display machine 202 of the first user 200.

The software running locally on the display machine 202 of the user 200 receives the data from the remote database 208 and applies a calibration process to the display 204. Thereafter a test is launched:

to verify the initial calibration result, to adjust the white and black luminance level of the display 204, and to accept (or reject) the display 204 to be used for medical imaging.

The result of the test is again sent from the display machine 202 to the remote database 208 where it is stored so that the system learns from the test. The display 204 of the first user 200 is defined to reach a pre-determined level of compliance (e.g. diagnostic versus reviewing level). Based on that data, the test will be refined and can be updated to user 200 so the best calibration is done.

A second user 212 has software running locally on his or her display machine 214, and a luminance meter (not represented in FIG. 11) for his or her display 216. All detailed information such as e.g., but not limited to, measurement data, luminance meter info, . . . is sent to and stored in the remote database 208. This brings the validation of the characterization data of displays of the type of display 216 to a much higher level.

An example of an application of the above may be as follows. A medical facility may have bought a number, e.g. 200, of displays of a certain type, e.g. DELL flat panel displays, for administrative work. Now it seems that in a lot of cases radiologists quickly login into the PACS system through the browser of these workstations, where they review some medical images. If the facility has characterized 5 of these displays, and there is software available reading all technical parameters of these displays, this can be sent to the remote database 208 and all other displays of the same type connected to the remote database 208 can be calibrated, and remotely set to the same parameters and calibration target. In some cases, the controls (On Screen Display) on the displays are blocked (and thus not modifiable by the user), which means that it is pretty sure that all displays will be DICOM GSDF calibrated when the radiologist logs on. If no such software is available for reading the technical parameter(s) of the display, the method falls back to what is described for the third user 218 below: a fast calibration is done, and it can be validated by running a quick test.

For a third user 218 the story is analogous: once the remote database 208 can identify his or her display 220, a fast calibration can be done without any effort. An extra test verifies whether the calibration is valid, and whether the display is now compliant to its needs, in particular e.g. for displaying medical images.

Assuming that the third user 218, e.g. a QA responsible person, sees a medical image that is not shown correctly (e.g. too bright and no details in the dark area), then the third user 218 would first blame the display 220 for this error. He or she can now launch a visual test where he or she verifies the calibration of the display 220. If the calibration is OK, the user 218 can be sure that there is something wrong with the generation of the image on his computer 222: either something is wrong with the viewing application, or the image was badly acquired during the acquisition process.

To identify what the problem is, a PACS viewing application can use the service of the remote database 208 and retrieve the right display parameters. If the viewing application knows how the display system 222 of user behaves, it can apply the same test to ensure that it displays the image correctly. So in that case the root cause of the problem can be identified.

The above opens up new possibilities to provide a public service with general display parameters (e.g. contrast, color temperature settings, . . . ), characterization, calibration and test data of different displays in order to achieve a worry free DICOM GSDF calibration. One of the problems with all existing visual DICOM calibration algorithms is that a "guess" is required for the absolute black luminance and the absolute white luminance. However, this luminance value (in $cd/m^2$) of the black and white is needed to result in a good DICOM calibration. The absolute luminance value is dependent on the ambient light (reflection in the display) and the backlight setting and transmittance of the display itself. Another problem with existing visual DICOM calibration algorithms is that it is very difficult to determine if the perceptual distance (in p-values) between the calibrated greyscale levels is equal. DICOM indeed requires not only that all grey levels are located on a specific absolute luminance curve but also that the perceptual distance between these greyscale levels is equal.

Figure 8:
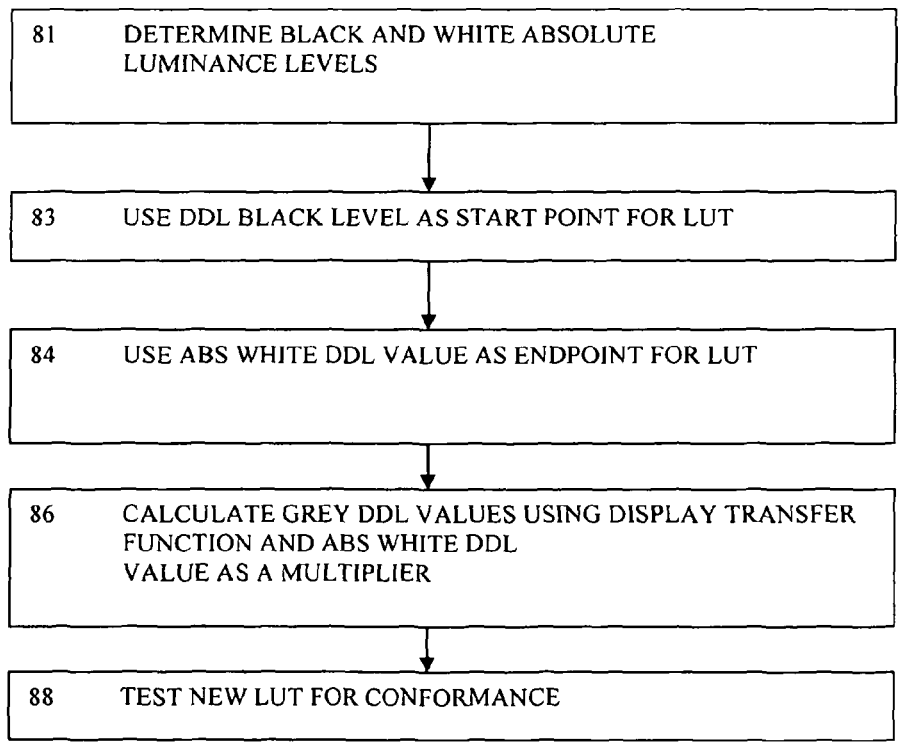
FIGS. 8 and 9 show steps according to embodiments of the present invention.
Figure 10:
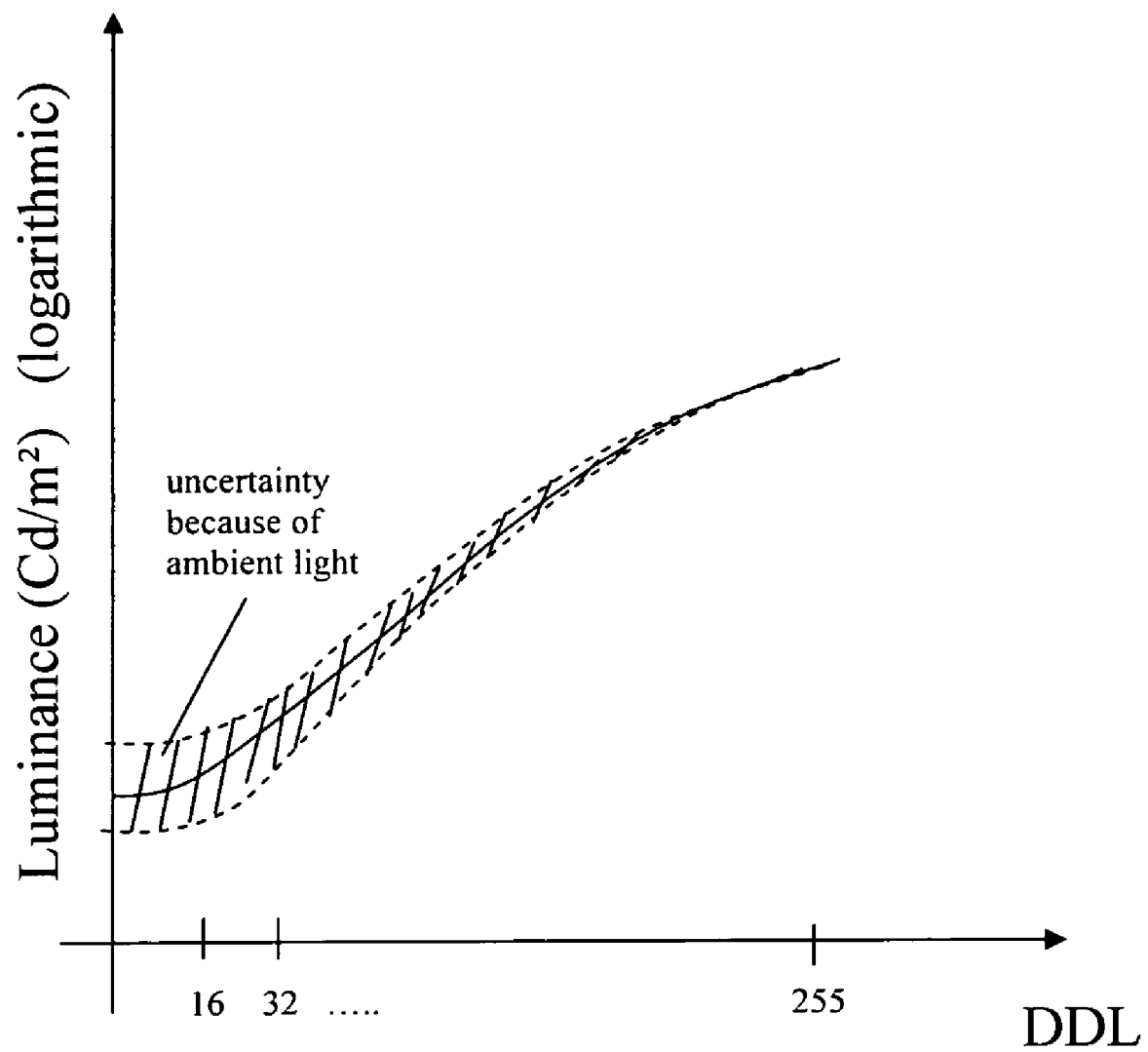
FIG. 10 shows a graph of a transfer function of a display.

The second aspect of the present invention addresses those problems. FIG. 8 shows an example of steps involved in calibration, which can be carried out by the system of FIG. 5 for example. At step 81, absolute luminance values are determined for black and white input signals. At step 83, the DDL corresponding to a black level is used as a starting point for a new LUT. At step 84, the DDL corresponding to a white level is used as an endpoint for the LUT. At step 86, the values for greys in between are calculated, using the transfer function of the display and the white DDL level as a multiplier. An example of a transfer function is shown in FIG. 10. The new LUT is inserted into the converter 20 and the system can be tested for conformance, as discussed above, or using other methods.

Figure 9:
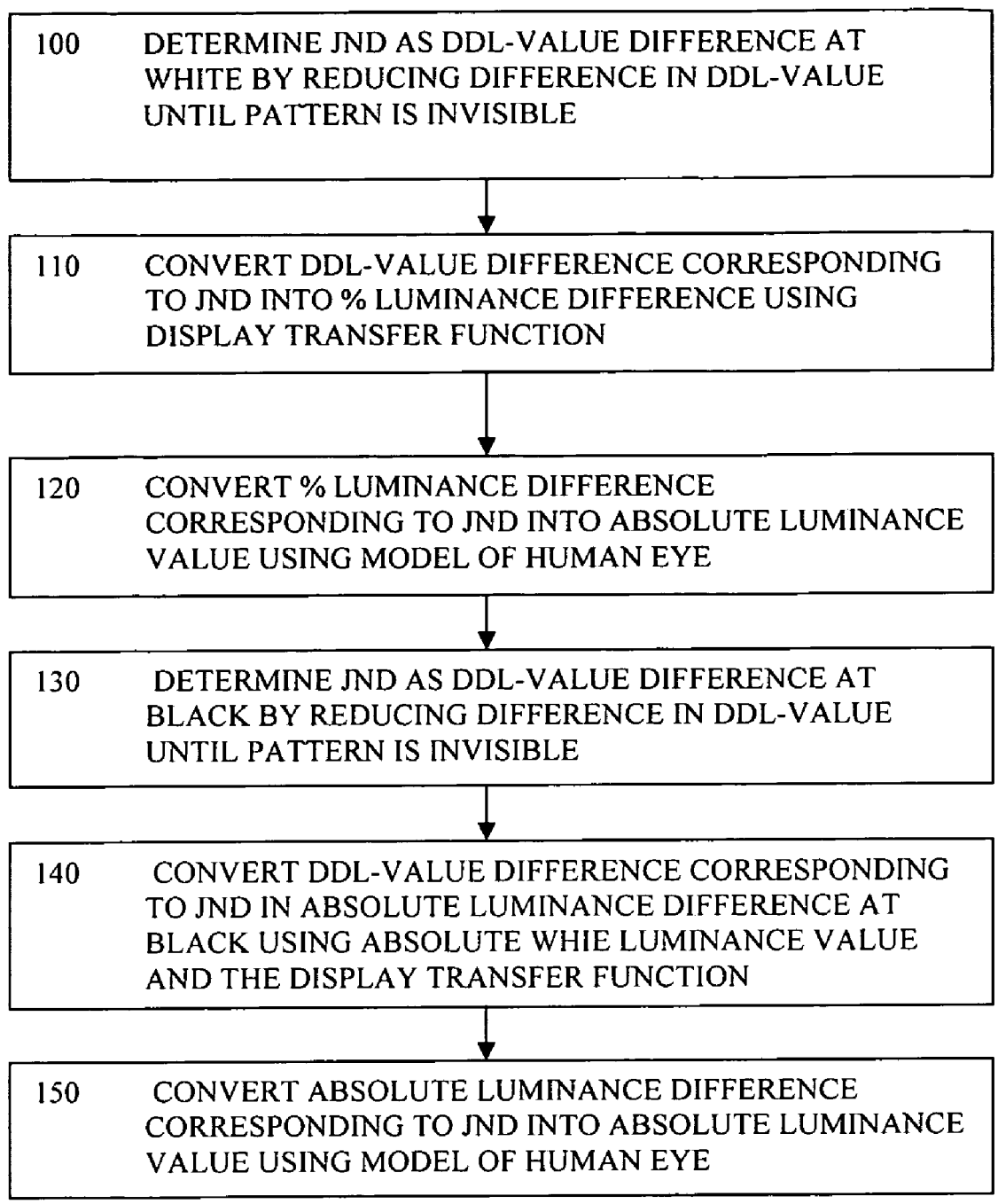

In FIG. 9 is shown steps for determining the white and black output luminance levels, without having to use an internal or external light sensor. At step 100, a JND in p-value at white luminance levels is determined by reducing a difference in luminance of a displayed pattern with respect to the luminance of a background, until the pattern is invisible (or increasing a difference in luminance of a displayed pattern with respect to the luminance of a background, until the pattern becomes visible). This can be carried out as described above. Determining absolute value of the white luminance can be carried out ignoring the effect of ambient light because the reflected ambient light typically is many orders of magnitude smaller in luminance than the light created by the display itself when the display is set to (near) maximum DDL. This is done by showing a test pattern with a small difference in video-level from the background. The number of grey level difference (difference in DDL) is then gradually increased until the user sees the test pattern. From the (relative) transfer function curve of the display, the percentage difference between the levels that are shown can be found. By decreasing/increasing the difference between the grey levels the percentage difference in grey level that can just be observed by the user (step 110) can be determined. By means of the Barten model the absolute luminance value of the white can now be found (step 120) as the point on the Barten model where 1 JND difference equals the found percentage luminance difference. The Barten model predicts which differences in absolute luminance value can be distinguished by the human eye, in other words: the contrast sensitivity of the human eye is described in function of absolute luminance value.

Step 130 shows the next stage is to do the same for black. Once the white luminance level is known, it is easy to find the absolute black luminance in the same way (by showing small differences in grey level at dark video levels). The black luminance obtained includes reflections from ambient light that cannot be ignored.

Several models of the human vision system exist. One of them is Barten's model that is used among others in the DICOM GSDF specification. The Barten model predicts which differences in absolute luminance value can be distinguished by the human eye, in other words: the contrast sensitivity of the human eye is described in function of absolute luminance value.

By asking the user if differences between grey levels can be observed it is possible to find the absolute black and white level. Instead of asking the user for input to detect whether or not he or she was able to perceive a subtle pattern, it is also possible to use eye-tracking or gaze-tracking technology. With such technology it is possible to measure in real-time where the user is exactly looking at. Therefore, a possible approach would be to make the subtle patterns (that are generated by the calibration or QA algorithm) appear on random locations on the display surface. If it is then noticed that the user is looking for at least a minimal amount of time at such a location (in other words if the user is fixating on that location) then it can be deduced that the user has detected the pattern. The approach using eye-tracking or gaze-tracking can make calibration or QA more user friendly, more robust, more transparent and faster.

In order to find absolute black and white levels, as a start, small differences in grey level are shown at high video levels. In this case the effect of ambient light can be neglected (with a white luminance of 500 $cd/m^2$ and a typical reflected ambient light of around 1 $cd/m^2$ the error made is approx. 0.2%).

Gradually the difference in grey level is decreased until the smallest difference that can be seen by the user is found. Because the transfer curve of the display is known (out of a database or stored into the display) we know which relative difference (in percent) corresponds to this difference in grey level. The only thing to do now is to look at the Barten model and find the absolute luminance value that corresponds to one JND for that relative difference in luminance. In this way we find the absolute luminance of fully white.

For the black level, knowing the transfer curve of the display and also the absolute white level of the display, the absolute difference between the smallest difference in grey levels that can be perceived at step 140 can be calculated. This is done in a similar way: by showing small differences in grey level at low video levels and increasing/decreasing the difference between the levels of grey until the difference can just be perceived. At this moment the absolute white point of the display (in $cd/m^2$) is known as is the transfer curve of the display system. It is now easy to translate the difference in grey levels (DDL value difference) that can just be perceived into an absolute difference in luminance that can just be perceived. For instance: if the difference between video level 0 and video level 2 can just be perceived, and if the difference between video level 0 and video level 2 corresponds to a 1% variation (follows from the known transfer curve), and if the white point of the display was at 500 $cd/m^2$ (found earlier in the process), then the absolute difference between video level 0 and video level 2 is 5 $cd/m^2$. This means that under the present ambient lighting the difference of 5 $cd/m^2$ can just be perceived (corresponds to 1 JND). By again using the Barten model the absolute luminance value (display light+reflected ambient light) that corresponds to this absolute luminance difference in display light can be found, at step 150. Now the absolute luminance of the black level (including reflections of ambient light), the absolute luminance of the white level (including reflections of the ambient light) and the native panel curve are known. It is to be noted that reflected ambient light itself can easily be calculated as absolute luminance of the black level (including reflections of ambient light) minus the display light for video level 0 (known from the transfer curve and absolute white value of the display). It is now trivial to calculate the lookup tables required to have DICOM conformance.

The transfer function of the display is shown in FIG. 10 as luminance L for different values of DDL. Perceived luminance can be seen as $L=a+t(DDL)\cdot W$, where a=ambient light reflected from the display, W=white level, and t(DDL)=a native transfer curve of the display. As indicated, there is more uncertainty at lower light levels as ambient light plays a larger role.

In case of lower quality display systems it might be that one difference in grey level is already visible. In that case it is not clear whether that difference of one grey level is exactly the point where the difference becomes visible or whether for instance half of that difference would also be visible. This will obviously result in inaccuracies in the absolute luminance estimations for black and white. An obvious solution is to use dithering (spatial or temporal) in case one level difference in grey level corresponds to a large difference in percentage luminance value. Of course it is also possible to always use dithering in order to make a more accurate estimation of absolute luminance values for black and white. It is to be noted that if the transfer curve of the display is known, then it is easy to predict what the transfer curve of a dithered signal would look like.

It is to be noted that the DICOM GSDF curve contains some areas where the slope of the curve is rather constant over a certain JND range. This is of course an unwanted situation for the present model. Indeed: if more absolute luminance values exist where one JND corresponds to a measured relative difference in luminance value then it becomes impossible to determine the exact absolute luminance value looked for. The same thing is valid for determining black level: in that case it could be possible that multiple absolute luminance values exist where one JND corresponds to a specific absolute difference in luminance value. One solution could be to change the brightness of the display in a controlled way. For instance: an LCD typically has a backlight. If the luminance output of the backlight is changed in such a way that the resulting luminance values end up at another point of the DICOM GSDF curve where the slope of the curve has more variation, then it will be easier to determine the absolute black and white point accurately. For instance: suppose that the higher video levels of a display system correspond to around 500 $cd/m^2$. In that area the slope of the DICOM GSDF curve is rather constant. Therefore it would not be clear to which absolute luminance value a measured just noticeable relative difference in luminance corresponds. However, if the backlight of the LCD is set to $1/10^{th}$ of its original value, then the high video levels of the LCD would correspond to around 50 $cd/m^2$. At 50 $cd/m^2$ there is a lot of variation in the DICOM GSDF curve (the slope is not constant). Because the absolute value of the backlight does not have an impact on the relative (known) transfer curve of the display, it is still possible to know which percentage difference in luminance corresponds to a difference in a specific number of video levels. Therefore it is still possible to find the absolute white luminance value that is coming out of the display at that moment. Of course, because the backlight was set to $1/10^{th}$, the absolute luminance value in case of 100% backlight will be 10 times the obtained absolute luminance value for white. The same principle holds when determining the absolute black value. It is to be noted that multiple technologies allow to accurately set the backlight value to a factor compared to the original value. With LEDs (light emitting diodes) for instance, one typically uses PWM (pulse width modulation). When the duty cycle of the PWM signal is changed, the light output of the LEDs will change linearly accordingly. The same thing holds for PWM driven CCFL (cold cathode fluorescent lighting) lamps. By setting the duty cycle of the signal to for instance $1/10^{th}$ of the original value, the output luminance value will also be $1/10^{th}$ of the original luminance value. It is to be noted that it is not required to have a perfectly linear backlight system. If one knows the behaviour of the backlight system in function of its driving signal then it is possible to calculate what the driving signal needs to be to have for instance $1/10^{th}$, $1/5^{th}$, $1/3^{rd}$, 2, 3, . . . times the original luminance value. Another solution is to use a (cheap) luminance device. Often a photodiode is integrated in the display system (at the front of the display or in the backlight system itself). This photodiode is generally not capable of measuring absolute luminance values, but allows for performing pretty accurate relative luminance values (because the photodiodes are normally very linear or a linearisation correction is applied internally). In this way it is possible to set the backlight output luminance to a desired factor compared to the original luminance value by making sure that the response of the sensor shows the same ratio of new value compared to original value.

To further improve the accuracy of the algorithm it is possible to add extra "measurement points" for the absolute luminance value. The same procedure can indeed be repeated at non fully-black or fully-white video levels to have extra intermediate values of the absolute luminance. The number of measurement points can be freely chosen and also the exact DDL value where the measurement is performed can be chosen. One criterion to select an appropriate DDL value where an absolute luminance measurement is performed could be the variation in steepness of the absolute luminance versus JND curve at that DDL level.

Yet another optimisation is to estimate the number of JNDs in a range of DDL values. This reduces the quantization errors. Indeed: suppose at black, fully black is shown and the difference in DDL values is determined that corresponds to 1 JND. This could be for instance 2 DDL values (so difference between DDL 0 and DDL 2 can just be perceived). Now the difference that is needed between DDL value 2 and a higher DDL value to correspond again with one JND is also determined. This could be for instance 3 DDL values. This means that the difference between DDL value 2 and DDL value 5 can just be perceived. The absolute difference between DDL value 0 and DDL value 5 (for instance 4 cd/m$^2$ based on known transfer curve and white point) can now be translated into absolute luminance value by looking on the GSDF curve for an absolute luminance value where a difference of 2 JNDs corresponds to an absolute difference of 4 cd/m$^2$. As an additional check it can also be verified whether the two differences of each one JND also are valid for that found absolute luminance value. Of course the same concept holds for determining the absolute white value or any other absolute luminance value.

Another variant to visually describe the display is also disclosed in the present invention. The ultimate goal of DICOM GSDF calibration is to have a display that is perceptually linear to the user of the display. To achieve that, a standard observer response (the DICOM GSDF curve) was created that describes the perception (JND index) of a standard observer in function of the absolute luminance. However, it is known that there can be variation in the perception of light for different persons. In other words it is possible that some human observers are able to discriminate smaller "just noticeable differences" than other users. This could be a problem since perfect calibration to DICOM GSDF in such a case would not guarantee that a user perceives the display as perfectly perceptually linear. Following visual calibration algorithm, according to an embodiment of the present invention solves this problem. The idea is to measure at several points on the luminance transfer curve (luminance in cd/m$^2$ in function of digital drive level) of the display how many digital drive levels correspond to one JND. In other words: at several points on the transfer curve on the display will be measured what the minimal difference should be in digital drive levels (DDLs) so that the specific person that performs the visual calibration will just notice the difference between two grey levels. Several methods are possible to perform these measurements. One obvious method is to display a background of a specific digital drive level (DDL1) and a patch or symbol of another digital drive level (DDL2) and then ask the user whether she/he can perceive the patch/signal. Instead of asking "whether" the user can perceive the symbol (yes/no question) of course also the methods described above can be used where the user is asked to select between a plurality of possible symbols, or eye-tracking or gaze-tracking technology can be used. In the beginning DDL1 and DDL2 should differ only very little and the difference between DDL1 and DDL2 should be increased gradually until the user can notice the difference or (in case of symbol selection) the user consistently selects the correct symbol or (in case of eye-tracking or gaze-tracking) the user fixates the location of the difference noticed. This procedure allows measuring the number of digital driving levels (DDLs) that correspond to exactly one JND for the specific user performing the visual calibration. It is possible, however, that the smallest possible difference between DDL1 and DDL2 already would be visible to the user. In that case an inaccurate measurement has been made since one cannot know whether that difference between DDL1 and DDL2 corresponds to exactly 1 JND or to more than 1 JND. In this situation one could use spatial dithering (sometimes called error diffusion) or temporal dithering in order to make the smallest difference smaller between DDLs that can be displayed on the display. For example: if one would have background of DDL 128 and a patch of DDL 129 and if this would already be visible, then one could either spatially dither the background to obtain a DDL that is closer to DDL 128 (for example but not limited to DDL level 128.25 or 128.5 or 128.75 or any other suitable value between DDL level 128 and DDL level 129) or spatially dither the symbol as to obtain a perceived symbol DDL value that is closer to DDL 128 (for example but not limited to DDL level 128.75 or 128.5 or 128.25 or any other suitable value between DDL level 128 and DDL level 129). Alternatively one could use temporal dithering as will be obvious for someone skilled in the art. By using these dither methods one can come up with very accurate measurements (the number of DDLs that corresponds to one JND can be a floating point number) and this both if the number of DDLs per JND is <=1 DDL and >1 DDL.

By repeating this measurement method one can come up with an accurate estimation of the number of DDLs that correspond to 1 JND and this for multiple points on the display transfer curve (in other words: for multiple DDL values). It is to be noted that if one only did a limited number of measurements then one can use any available interpolation method to create data in between the measured points. For example one could use linear interpolation to calculate the number of DDLs corresponding to one JND for DDL values where no measurement was done. If one uses interpolation to create a curve describing for each DDL value the number of DDL values corresponding to one JND, then one can also use the inverse of this curve (y=1/x where x is the value on the original curve and y the value on the inverse curve) to calculate the total number of JNDs available on the display system. This can be done by integrating this inverse curve (for example using a Riemann integral) over DDL value minimum to maximum.

An example of measurement results could be: at DDL level 0 4.8 DDLs are needed for 1 JND, at DDL level 128 2.2 DDLs are needed for 1 JND, at level 255 1.2 DDLs are needed for 1 JND. Of course the number of measurement points can be varied and also the position of the measurement points on the transfer curve (the base DDL value) can be varied based on for instance limitations on the calibration time. Based on these results the total number of JNDs that are available on the display system can be calculated. Indeed: suppose a display system has DDL values between 0 and 255. Suppose that measurements have been made at DDL values 0, 128 and 255 and that the results were 4 DDLs/JND at level 0, 2 DDLs/JND at level 128 and 1 DDL/JND at level 255. Then one can calculate the total number of available JNDs for the display system by integrating this curve. In this example: between DDL value 0 and DDL value 128 the average number of DDLs/JND will be the average of 4 and 2 which is three. Therefore between DDL value 0 and DDL value 128 one will have 128/3 JNDs or 42.6 JNDs. In the same way one can calculate that there are 128/((2+1)/2)=85.3 JNDs between DDL value 128 and DDL value 255. Therefore the total number of available JNDs for this display system will be 42.6+85.3=127.9. Since the total number of JNDs are now known, it is now also known that to make the display perceptually linearized there should be 127.9/255=0.5 JNDs between each step of the display system. Indeed: 127.9 JNDs is the total number of available JNDs and 255 is the number of steps the display system has (there are 256 levels but 255 steps between levels). Since it is also known how many DDLs correspond to one JND and this for multiple base DDL values (positions on the transfer curve of the display) the lookup-table that is necessary to generate a perceptually linearized display can now be calculated. For example: if one knows that each step should correspond with 0.5 JNDs and for DDL value 0 one needs 2 DDL values for 1 JND, then one knows that the lookup table entry for DDL=0 should be 0 and the entry for DDL=1 should be 1. One can continue in the same way and iteratively calculate the required values for the calibration lookup table. It is to be noted that one should be cautious not to insert any systematic errors while calculating the lookup table entries. Suppose that one would have calculated that a difference of 0.4 DDLs is needed for two consecutive entries in the lookup table and suppose that the first value is 2. Since one cannot (typically) enter float values one would therefore enter the same value in both entries of the lookup table which is DDL 2 and DDL 2. However, when calculating the next required value in the lookup table, one should start from DDL 2.4 as base value, otherwise one would be inserting accumulating errors. Indeed, suppose the next required step is 1.1 DDLs, then one would need the value DDL 2.4+1.1=DDL 3.5 or rounded for example DDL=4. One should not calculate the next value as 2+1.1=3.1 or rounded DDL 3 since then a systematic error will have been inserted for the remainder of the lookup table.

Advantage of the described method is that this method is robust to (small) differences in the way human observer perceive images. Indeed, if one observer would be more sensitive and therefore be able to discriminate smaller differences in grey scales than another observer, then the total calculated number of JNDs for the display in case of the more sensitive observer would be higher. But if the shape of their JNDs versus luminance curve of each of the observers is the same then both observers would end up with the same calibration lookup table. In other words: the described algorithm guarantees that the display will be perfectly perceptually linearized for that specific observer (and not for a fixed standard observer that could have other characteristics). It is to be noted that the same technique can also be applied to colour displays. In that case the number of DDLs corresponding to 1 colour JND would be measured. It is to be noted that 1 colour JND could be split up in one JND corresponding to S-cones in the eye, in one JND corresponding to M-cones in the eye and one JND corresponding to L-cones in the eye.

Once the calibration is complete the display can be marked with suitable indicia, e.g. an alphanumeric label that the display is suitable for display of certain images, e.g. suitable for display of medical images.

In summary: a technique to measure the absolute luminance of the display white and black by means of visual test patterns has been described. It is to be noted that the features described above with reference to FIG. 6 to have easy, user-friendly, online visual DICOM QA check can of course also be used for the calibration steps 100 and 130. This can provide an easy to use DICOM calibration tool for every desktop display that is used for reviewing medical images.

As has been described, testing a display involves display of a series of test patterns, each at a different luminance or colour, and with a predetermined minimum difference of luminance or colour from their background, each pattern being unpredictable to a user, and determining if the user has correctly identified the patterns. This can enable a more objective test without needing external measuring equipment. Calibrating the display involves determining an output luminance level by detecting a minimal difference of drive signal to give a just noticeable output luminance difference at a given high luminance drive level, and determining an absolute luminance of the given high input luminance level from the minimal difference and from a predetermined human characteristic of visibility threshold of luminance changes. This can avoid the need for an external or internal sensor. This can be useful during conformance checks, or during calibration of the display for example. Other variations will be apparent to those skilled in the art.

The invention claimed is:

1. A system for testing a display, comprising a test generator arranged to display a series of test patterns, each at a different luminance or colour, and with a predetermined minimum difference of luminance or colour from their background, each pattern being unpredictable to a user, and having a test evaluator arranged to determine and record if the user has correctly identified each of the patterns, wherein the test generator is arranged to display alongside each displayed test pattern a selection of candidate patterns for the user to choose a matching pattern.

2. The system of claim 1, the test generator being arranged to display an array of more than one of the test patterns at a time.

3. The system of claim 1, including a device arranged to set the minimum difference.

4. The system of claim 1, including a device arranged to send a result of the testing, and an identifier of the display being tested, to a remote database.

5. The system of claim 4, including a device arranged to retrieve calibration data from the remote database for a display of a same type as the display for which the result of the testing have been stored previously.

6. The system of claim 1, including a device arranged to select different levels of background luminance or colour to test, the selection being spread across the range of the display.

7. The system of claim 6, including a device arranged to choose a different selection for subsequent tests, to test all levels after a given number of tests.

8. The system of claim 1, including a calibrator for altering circuitry used to derive the driving levels of the display.

9. A display comprising the system of claim 1.

10. A method of testing a display comprising the steps of displaying a series of test patterns, each at a different luminance or colour, and with a predetermined minimum difference of luminance or colour from their background, each pattern being unpredictable to a user, and determining and recording if the user has correctly identified each of the patterns, wherein displaying the series of test patterns includes displaying alongside each displayed test pattern a selection of candidate patterns for the user to choose a matching pattern.

11. The method of claim 10, including the step of marking the display with indicia that the display is suitable for displaying medical images.

* * * * *